J. SELBY.
Corn Planter.
No. 3,148. Reissued Oct. 6, 1868.
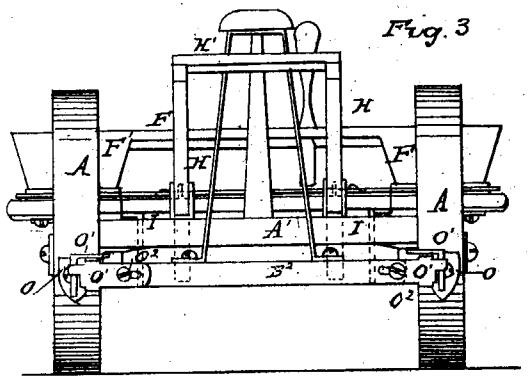
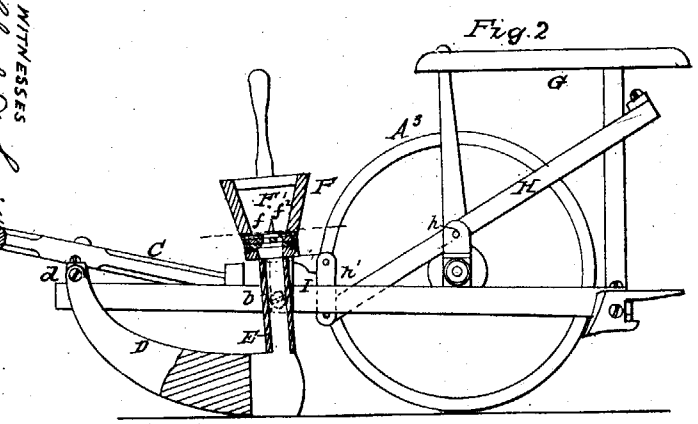
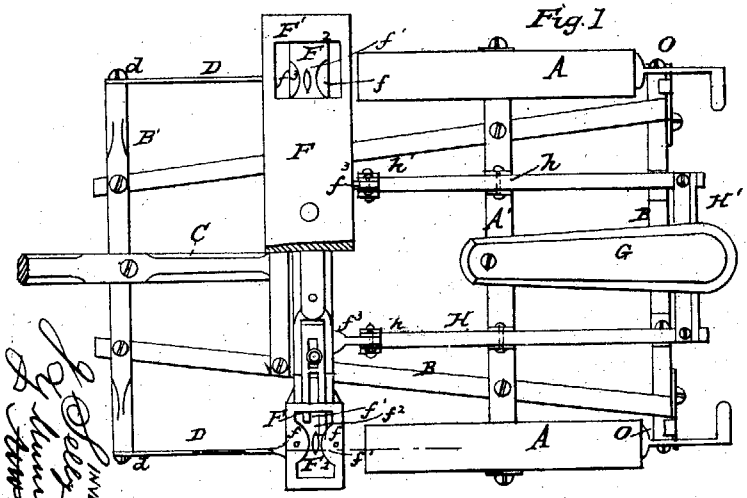
WITNESSES
Charles D. Smith
R. H. Mayhar
INVENTOR
J. Selby
Y. Munro & Co
Attorneys
N. PETERS, Photo-Lithographer, Washington, D. C.

UNITED STATES PATENT OFFICE.

JAMES SELBY, OF PEORIA, ILLINOIS.

IMPROVEMENT IN CORN-PLANTERS.

Specification forming part of Letters Patent No. 44,019, dated August 30, 1864; Reissue No. 3,148, dated October 6, 1868.

*To all whom it may concern:*

Be it known that I, JAMES SELBY, of the city and county of Peoria, and State of Illinois, have invented certain new and useful Improvements in Corn-Planters; and I hereby declare that the following is a full, clear, and exact description thereof, reference being had to the accompanying drawings, making part of this specification, in which like letters indicate like parts wherever they occur.

Figure 1 is a top-plan view. Fig. 2 is a side elevation, and Fig. 3 is a rear elevation, of my improved machine.

It has hitherto been customary to construct this class of planters with a front and rear frame, hinged together at or near the rear part of the front frame. Instead of following this plan I make a single frame, consisting of two side bars, B, of the full length of the machine, and connect them at both front and rear by cross-bars B′, and mount it at about one-third its length from the rear end on an axle, A′, supported on wheels A at its end, as represented in Fig. 1. Upon the rear part of this frame I locate a driver's seat, G, and to the ends of the front cross-bar I pivot the nose of a runner, D, on each side. From the rear end of these runners a seed-tube, L, rises on each side, and upon these tubes are mounted the seed-hoppers $F^1$, which are connected by a plank, F, secured to their top, and also by a bar, P, at their base, extending across from one to the other, as represented in Figs. 1 and 3, the plank F being shown broken away in Fig. 1.

Upon the axle A′ a frame, consisting of two bars, H, connected at their rear end by a cross-bar, H′, is fulcrumed in supports $h'$, the front end of these bars being pivoted by links $h$ to short projecting arms $f^3$, secured to the cross-bar P, connecting the base of the hoppers, as shown in Figs. 1 and 2, these bars H thus serving as a lever, by which the driver may elevate the runners and hoppers by bearing with his feet on the rear portion of the levers H.

To each of the bars B of the main frame is secured a vertical plates, I, as represented in Figs. 2 and 3, these plates I being slotted and held in place by a set-screw, $i$, so that they can be raised or lowered, as desired, and being so located that the cross-bar P at the base of the hoppers shall rest on them when the runners are let down for planting. The rear part of the frame rests on the wheels A, while the front end is supported by the tongue C, which is bolted rigidly thereto, and has its front end supported by the neck-yoke of the team. It will thus be seen that by adjusting the plates I the depth that the runners D will enter the earth can be regulated at will.

A seed-slide, $F^2$, works transversely through an opening under the hoppers, as usual in this class of machines, these slides being provided at each hopper with two apertures or seed-cells, $f^1$, which are arranged to receive the seed and convey it under the cut-off $f$ and deposit it in the seed-tubes L.

At the proper position in the bottom of the hoppers are located the cut-offs $f$, which are semicircular plates projecting inward from opposite sides of the hopper, as shown in Fig. 1, and which are so located as to leave between them a space back and forth, in which plays a vertically-projecting pin, $f^2$, attached to the seed-slide, which thus acts as a stirrer to keep the seed from clogging in the hoppers. These semicircular cut-offs serve to cut off the seed from the seed-cells gradually, and prevent the grains from being caught or crushed, as is more or less the case with the ordinary cut-offs heretofore used.

To the opposite ends of the rear cross-bar, B′, of the main frame I pivot on each side a scraper, O, directly in rear of the wheels A, these scrapers having a foot-lever, $o'$, projecting rearward, as represented in Figs. 1 and 2. By placing his feet on these levers the driver can at any time press the scrapers O against the wheels, and thus clear them of any adhering dirt. To the rear side of the cross-bar B′, at each end, is secured by a set-screw, $e$, a plate, O′, which is so arranged that they may, by being moved outward, hold the levers $o'$ up, and thus keep the scrapers O from contact with the wheels.

In operating the machine the dropper sits upon the plank F between the hoppers, and moves the seed-slide by a lever in the usual manner. When it is desired to elevate the runners for turning the machine, or for going over the ground without planting, as in traveling to and from the field, the driver places his feet on the rear portion of the levers H, by which the hoppers and runners are elevated at their rear end, the runners turning on the pivot *d* in the arc of a circle.

By this method of constructing the machine I am enabled to produce a planter that is simple, cheap, and efficient, and that operates in a very superior manner.

Having thus described my invention, what I claim is—

1. The main frame mounted on two wheels and having the runners pivoted at their front end to the front part of the main frame, substantially as described.

2. The levers H, connected to the hoppers or runners by the links *h*, and arranged to operate as described.

3. The hoppers $F^1$, connected by one or more cross-bars located above the main frame B, so as to permit the hoppers and runners of the machine to be raised or lowered without elevating the front part of the main frame, substantially as described.

4. The semicircular cut-offs *f*, constructed and arranged to operate substantially as described.

5. The adjustable plates I, arranged to support and regulate the position of the runners, substantially as set forth.

6. The combination of the pivoted scrapers O and the adjustable plates O′, when arranged to operate as described.

JAMES SELBY.

Witnesses:
A. B. FINK,
MICHAEL D. SPURCK.